(12) United States Patent
Hashimoto et al.

(10) Patent No.: US 12,153,734 B2
(45) Date of Patent: Nov. 26, 2024

(54) IMAGE DISPLAY DEVICE AND IMAGE DISPLAY METHOD

(71) Applicant: MAXELL, LTD., Kyoto (JP)

(72) Inventors: Yasunobu Hashimoto, Kyoto (JP); Yoshinori Okada, Kyoto (JP); Hitoshi Akiyama, Kyoto (JP); Nobuo Masuoka, Kyoto (JP); Koji Kaniwa, Kyoto (JP); Nobuaki Kabuto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/265,938

(22) PCT Filed: Dec. 8, 2020

(86) PCT No.: PCT/JP2020/045733
§ 371 (c)(1),
(2) Date: Jun. 7, 2023

(87) PCT Pub. No.: WO2022/123663
PCT Pub. Date: Jun. 16, 2022

(65) Prior Publication Data
US 2024/0028112 A1    Jan. 25, 2024

(51) Int. Cl.
*G06T 3/40*        (2024.01)
*G06F 3/01*        (2006.01)

(52) U.S. Cl.
CPC .............. *G06F 3/013* (2013.01); *G06F 3/012* (2013.01); *G06T 3/40* (2013.01); *G06T 2200/24* (2013.01)

(58) Field of Classification Search
CPC ............. H01L 27/3211; H01L 27/3218; H01L 51/5275; G06F 3/011; G06F 3/012; G06F 3/013; G06F 3/016; G06T 3/40
See application file for complete search history.

(56) References Cited

U.S. PATENT DOCUMENTS

2014/0168056 A1* 6/2014 Swaminathan ...... G06V 30/142
                                                    345/156
2015/0364109 A1* 12/2015 Jain .................... G06F 3/012
                                                    345/156

(Continued)

FOREIGN PATENT DOCUMENTS

JP    H10-112856 A    4/1998
JP    2005-038008 A   2/2005

(Continued)

OTHER PUBLICATIONS

International Search Report issued in corresponding International Patent Application No. PCT/JP2020/045733, dated Mar. 2, 2021, with English translation.

*Primary Examiner* — Nitin Patel
*Assistant Examiner* — Amen W Bogale
(74) *Attorney, Agent, or Firm* — Rimon P.C.

(57) ABSTRACT

An image display device is for displaying an image including a user in, and comprises: a display processing unit displaying an image within a user's visual field display range; and a processor controlling the entire operation including a display operation on the display processing unit. The processor controls the display processing unit such that, in a state where information is displayed at a low content level within a visual field display range by control of the display processing unit, when an observation point which a user observes closely stays within a prescribed display range for a prescribed period of time, the vicinity of the observation point is displayed as information of a high content level, whereas when the observation point has deviated from the location of said information of the high content level, the vicinity of the observation point is returned to the information display at the low content level.

10 Claims, 21 Drawing Sheets

(56) References Cited

U.S. PATENT DOCUMENTS

| | | | |
|---|---|---|---|
| 2019/0250773 A1* | 8/2019 | Miyaki | A63F 13/212 |
| 2019/0286227 A1* | 9/2019 | Samadani | G06F 3/017 |
| 2020/0051207 A1 | 2/2020 | Ogasawara | |
| 2020/0301505 A1 | 9/2020 | Cheng et al. | |
| 2020/0352499 A1* | 11/2020 | Frazier | A61B 5/163 |
| 2021/0093978 A1* | 4/2021 | Zhang | G02B 27/017 |

FOREIGN PATENT DOCUMENTS

| | | |
|---|---|---|
| JP | 2016-509705 A | 3/2016 |
| JP | 2020-522815 A | 7/2020 |
| WO | 2018/211672 A1 | 11/2018 |
| WO | 2019/135313 A1 | 7/2019 |

\* cited by examiner

ELAPSE OF PRESCRIBED PERIOD OF TIME

MOVEMENT OF OBSERVATION POINT

ELAPSE OF PRESCRIBED PERIOD OF TIME

MOVEMENT OF OBSERVATION POINT

FIG. 9

| ID | T1 Start | T2 Flag | T2 Start |
|---|---|---|---|
| aaa | 12:15:30 | 1 | 12:15:35 |
| bbb | 12:15:36 | 1 | 12:15:40 |
| ccc | 12:15:41 | 0 | - |
| ... | ... | ... | ... |

ELAPSE OF
PRESCRIBED
PERIOD OF
TIME Ta

MOVEMENT OF
OBSERVATION
POINT TO OUTSIDE
ELAPSED TIME OF
Tb OR SHORTER

REMOVEMENT OF
OBSERVATION
POINT TO INSIDE
ELAPSED TIME OF
Tb OR SHORTER

ELAPSE OF
PRESCRIBED
PERIOD OF TIME
Ta OR LONGER
AND Tb OR
SHORTER
(Tb > Ta)

ELAPSE OF
PRESCRIBED
PERIOD OF TIME
Tb OR LONGER

FIG. 13

| NUMBER OF OBJECTS | NON-OBSERVATION TIME Tb |
|---|---|
| 1 | T1 |
| 2 | T1+T2 |
| 3 | T1+T2+T3 |
| ... | ... |
| n | T1+T2+T3+···+Tn |

IMAGE DISPLAY DEVICE AND IMAGE DISPLAY METHOD

CROSS-REFERENCE OF RELATED APPLICATIONS

This application is the U.S. National Phase under 35 U.S.C. § 371 of International Patent Application No. PCT/JP2020/045733, filed on Dec. 8, 2020, the entire disclosure of which Application is incorporated by reference herein.

TECHNICAL FIELD

The present invention relates to an image display device and an image display method for displaying an image that a user is interested in.

BACKGROUND ART

Recently, an image display device displaying a real object in a reality space or a virtual object has been widely used. Examples of the image display device include a head mounted display (HMD) that is worn on the head and includes a display unit, a camera unit, and the like. In the HMD, the real object in the reality space or the virtual object is displayed on the display unit provided in front of the head (a so-called video see-through type), or the real object in front of the eyes is visually recognized by a user while the virtual object is displayed on the display unit (a so-called optical see-through type), and the real world and the virtual world are seamlessly fused in real time such that it is possible to have an experience as if the virtual object exists in the real world, and it is possible for the user to look closely the real object or the virtual object that the user is interested in.

Here, examples of a method for preponderantly and emphatically displaying an image that the user is interested in include Patent Document 1. In Patent Document 1, it is described that an image is drawn by changing an accuracy to approximately correspond to the visual power of the user on the basis of where the user is looking and/or the performance of a lens of the HMD, as a foveated rendering engine. For example, it is described that the image may be drawn at an observation point with a higher accuracy, the image may be drawn by gradually decreasing an accuracy level as a distance from the observation point increases, a portion to be displayed within the center portion of the visual field of the user may have a higher accuracy, and an image with a lower accuracy may be generated in the portion to be displayed within the surrounding portion of the visual field of the user.

As an example, it is described that drawing with a lower accuracy may be performed at a low definition, compared to drawing with a higher accuracy. That is, it is described that the observation point is displayed at a high definition, and is displayed at a low definition as the distance from the observation point increases.

CITATION LIST

Patent Document

Patent Document 1: JP 2020-522815 A

SUMMARY OF THE INVENTION

Problems to be Solved by the Invention

In Patent Document 1, there is a problem that even in a case where the user has no interest or intention of observation, the vicinity of the observation point determined by the visual line may be constantly displayed with a high definition, and an unnecessary calculation load resulting from a high definition process may be generated. In addition, there is a problem that in a case where the user has interest or intention for detailedly observing a certain range (for example, the surface of the object), the definition may be changed in accordance with the distance from the observation point, and thus, the display definition may not be uniform over the entire object, and the object may not look natural.

The present invention has been made in consideration of the problems described above, and an object thereof is to provide an image display device and an image display method that are for addressing the interest of a user while eliminating unnaturalness and that enable the suppressing of the generation of an unnecessary calculation load resulting from a high-quality image process when the user has no interest or intention of observation, and performing the high-quality image process when the user has the interest or the intention of the observation.

Solutions to Problems

As an example of the present invention, an image display device displaying an image that a user is interested in, includes: a display processing unit displaying an image within a visual field display range of the user; and a processor controlling an entire operation including a display operation on the display processing unit, in which the processor controls the display processing unit such that, in a state in which information is displayed at a low content level within the visual field display range by control of the display processing unit, when an observation point that the user observes stays within a prescribed display range for a prescribed period of time, a vicinity of the observation point is displayed as information of a high content level, wherein when the observation point has deviated from a location of the information display at the high content level, the vicinity of the observation point is returned to the information display at the low content level.

Effects of the Invention

According to the present invention, it is possible to provide the image display device and the image display method that are for addressing the interest of the user while eliminating the unnaturalness and that enable the suppressing of the generation of the unnecessary calculation load resulting from the high-quality image process when the user has no interest or intention of the observation, and performing the high-quality image process when the user has the interest or the intention of the observation.

BRIEF DESCRIPTION OF THE DRAWINGS

FIG. 9 is a display management list used in display control in Example 2.

FIG. 13 is a diagram illustrating a non-observation time in Example 2.

MODE FOR CARRYING OUT THE INVENTION

Hereinafter, examples of the present invention will be described by using the drawings.

EXAMPLE 1

In this example, a HMD will be described as a specific example of an image display device for addressing the interest of a user.

Figure 1A:
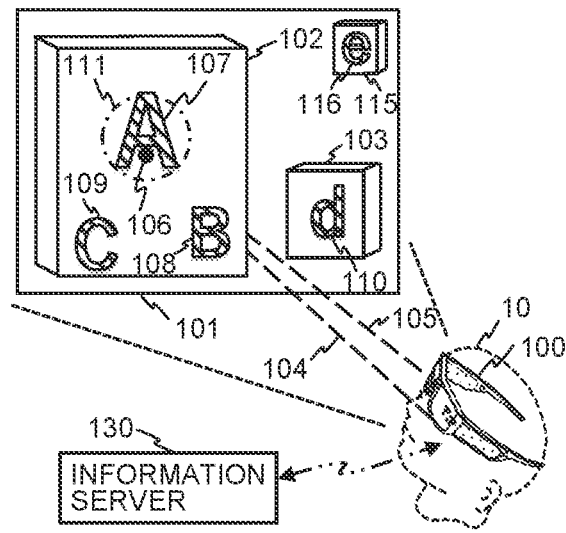
FIG. 1A to FIG. 1F are diagrams illustrating an image display method in Example 1.

FIG. 1A to FIG. 1F are diagrams appearance-schematically illustrating an image display method of the HMD in this example. In FIG. 1A, a HMD 100 is worn on the head of a user 10, and displays a real object or a three-dimensionally arranged virtual object within a visual field display range 101 of the user 10 such that the user 10 is capable of visually recognizing objects 102, 103, and 115 as an example of the real object or the virtual object within the visual field display range 101. In addition, an observation point 106 that the user 10 is interested in and observes is obtained by the direction of visual lines 104 and 105 of the both eyes of the user 10. An information content of an image displayed within the visual field display range 101 such as the objects 102, 103, and 115 is determined by setting a definition, a gradation, an update rate (the number of updates per unit time), and additional information as a factor, and high-level image display for indicating detailed description or the like with a high-quality image and a high definition according to a high content level information process that is a high-quality image process is available as the definition, the gradation, and the update rate increase and as the additional information associated with the object or the like increases. However, in the case of the high-level image display, a large information content may be required, and a large calculation load may be generated in the high content level information process.

Accordingly, in normal times in which the user has no interest, it is preferable and effective that the image within the visual field display range 101 is displayed as information of a low content level in which image quality or a definition is not particularly required, from the viewpoint of the calculation load.

FIG. 1A illustrates that the user starts to observe the observation point 106 in a state where the image within the visual field display range 101 is displayed as the information of the low content level, and letters 107, 108, and 109 seen on the surface of the object 102, a letter 110 seen on the surface of the object 103, and a letter 116 seen on the surface of the object 115 are represented by an oblique line in coarse display, and are each displayed as the information of the low content level. Note that, the information of the virtual object or the like may be generated in the HMD 100, or may be generated in an information server 130 to be supplied to the HMD 100 through an external network. In the information server 130, a large content of information can be handled, and for example, the virtual object can be generated with a high-quality image and a high definition.

Figure 1B:
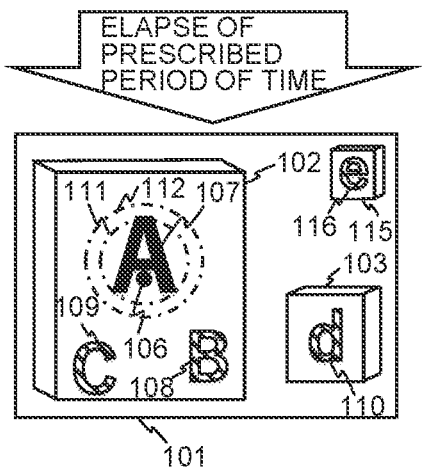

In a case where the observation point 106 that the user 10 observes with interest stays within a prescribed range 111 close to the observation point 106 for a prescribed period of time Ta or longer, as illustrated in FIG. 1B, an image of a vicinity 112 of the observation point is displayed by being changed to the information of the high content level from the initial state of the normal times in which the information is displayed at a low content level within the entire visual field display range. FIG. 1B illustrates that the letter 107 within the vicinity 112 of the observation point is represented in fill display, and the information is displayed at a high content level. Accordingly, in a case where the user continuously observes within the prescribed range close to the observation point for the prescribed period of time or longer, it is detected and determined that the user has the interest or the intention of the observation, and only in a case where the user has the interest or the intention of the observation, the image of the vicinity of the observation point that the user is interested in can be displayed uniformly as the information of the high content level with a high-quality image and a high definition. Further, in a case where the user does not continuously observe within the prescribed range close to the observation point for the prescribed period of time or longer, and it is detected and determined that the user has no interest or intention of the observation, the generating of an unnecessary calculation load resulting from the high content level information process can be eliminated.

Figure 1C:
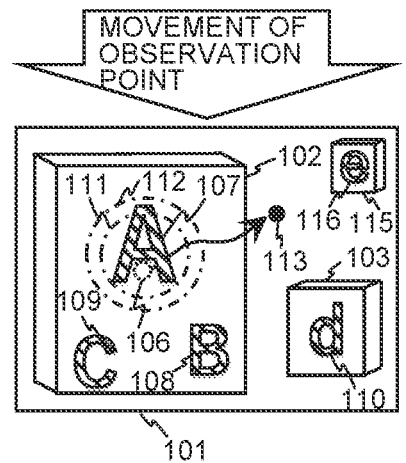

After that, as illustrated in FIG. 1C, in a case where the observation point 106 is moved, for example, to an observation point 113 greatly deviating from within the prescribed range 111 close to the observation point, the image displayed as the information of the high content level is returned to the original information display at the low content level. Accordingly, only when the user continuously observes within the prescribed range close to the observation point for the prescribed period of time or longer, only an image region for which the user has the interest or the intention of the observation can be displayed uniformly as the information of the high content level with a high-quality image and a high definition.

Accordingly, in a case where the user has no interest or intention of the observation by optimally considering a prescribed period of time Ta for continuous observation for switching to the information display at the high content level, the information is not unnecessarily displayed at a high content level, and the generating of the unnecessary calculation load is suppressed and eliminated, and only in a case where the user has the interest or the intention of the observation, the vicinity of the observation point for which the user has the interest or the intention can be conveniently displayed uniformly with a high-quality image and a high definition. Note that, in the above description, the prescribed range 111 close to the observation point and the vicinity 112 of the observation point are different regions, and the vicinity 112 of the observation point is a wider region including the prescribed range 111 close to the observation point, but both of the regions may be the same region, and both of the regions may have a reverse magnitude relationship.

Figure 1D:
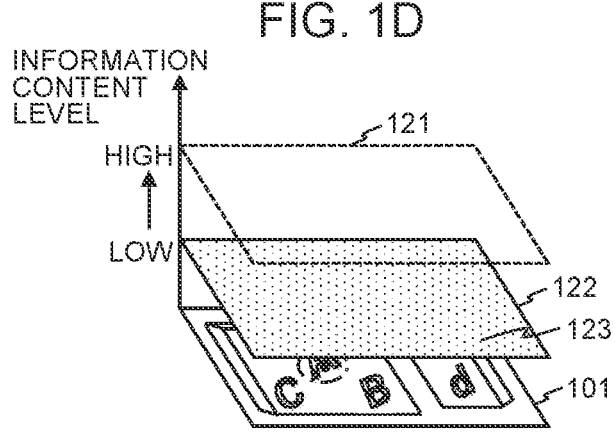
Figure 1E:
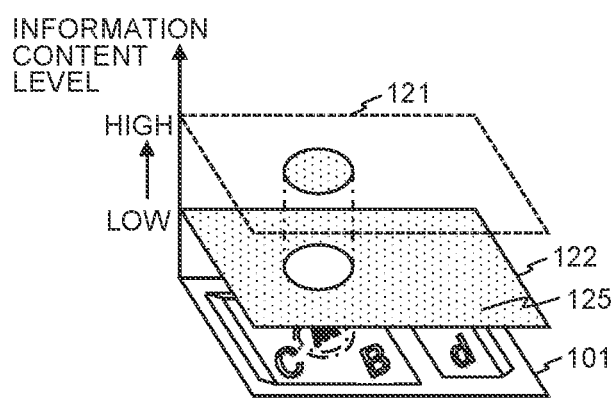
Figure 1F:
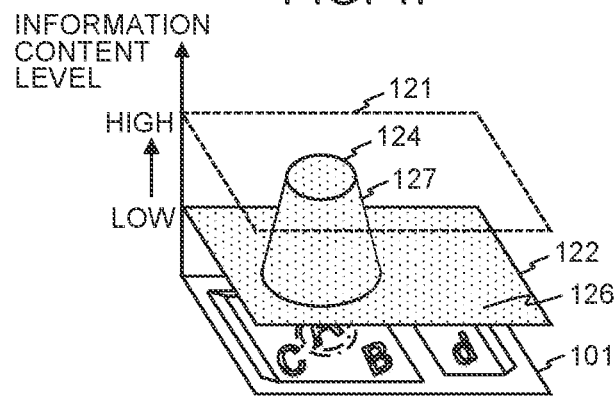

Next, an information content level at each position of a display screen within the visual field display range 101 will be described. FIG. 1D, FIG. 1E, and FIG. 1F illustrate that the level of information content at each position is indicated on a vertical axis by placing the display screen within the visual field display range 101 on a horizontal plane axis, a plane 121 indicates a state where the information content level is at a high level, and a plane 122 indicates a state where the information content level is at a low level. When the observation point does not stay within the prescribed range 111 close to the observation point for the prescribed period of time Ta or longer, in a state as illustrated in FIG. 1A, the information content at each position on the display screen, as illustrated in FIG. 1D, is the information display at the low content level on a hatched plane 123 over the entire visual field display range 101.

On the other hand, when the observation point stays within the prescribed range 111 close to the observation point for the prescribed period of time Ta or longer, in a state as illustrated in FIG. 1B, as illustrated in FIG. 1E, an information content at each position within the vicinity 112 of the observation point is the information display at the high content level on a hatched plane region 124, and an information content at each position deviating from the vicinity 112 of the observation point is the information display at the low content level on a hatched plane region 125. Accordingly, in a case where the user continuously observes within the prescribed range close to the observation point for the prescribed period of time or longer, only the image of the vicinity of the observation point for which the user has the interest or the intention of the observation can be displayed uniformly as the information of the high content level with a high-quality image and a high definition.

In addition, as illustrated in FIG. 1F, in the case of including an inclined surface region 127 for gradually decreasing the information content level from a plane region 124 in high content level information display toward a surrounding plane region 126 in low content level information display, the surrounding information content can be gradually changed from the image region in the high content level information display to the region in the low content level information display. Accordingly, it is possible for the user to look at the surrounding portion without feeling unnaturalness since the information content level is gradually decreased, while uniformly visually recognizing the image of the vicinity of the observation point for which the user has the interest or the intention of the observation with a high-quality image and a high definition.

Figure 2A:
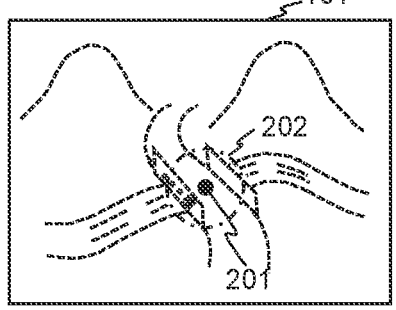
FIG. 2A to FIG. 2C are diagrams illustrating a specific example of FIG. 1.
Figure 2B:
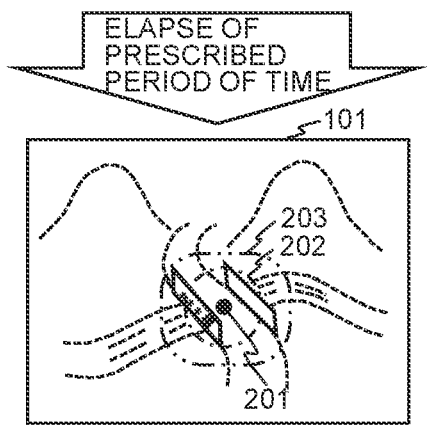
Figure 2C:
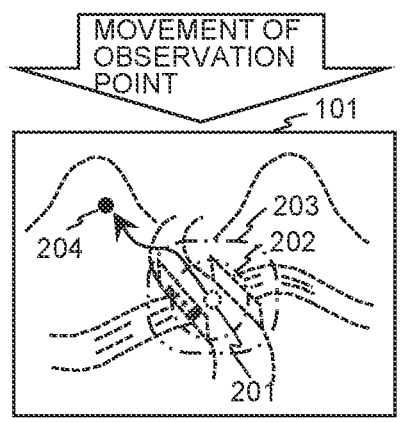

FIG. 2A to FIG. 2C illustrate a specific example of the image display method illustrated in FIG. 1A to FIG. 1F. In FIG. 2A to FIG. 2C, a video see-through type HMD displaying the real object in the reality space or the virtual object on a display provided in front of the head is illustrated. In FIG. 2A, a landscape including the mountain, the river, and the bridge is displayed within the visual field display range 101, and in the initial state of the normal times, the information is displayed at a low content level within the entire visual field display range (illustrated by a dotted line). In such a state, when the user continuously observes the portion of the "bridge" that the user 10 is interested in, and an observation point 201 stays within a prescribed range 202 close to the observation point 201 for a prescribed period of time or longer, as illustrated in FIG. 2B, a vicinity 203 of the observation point centering on the "bridge" is cut out from a captured image of the landscape by image analysis to generate a real object, the vicinity 203 of the observation point centering on the "bridge" is displayed as the information of the high content level (illustrated by a solid line). After that, as illustrated in FIG. 2C, in a case where the observation point is moved, for example, to an observation point 204 deviating from the prescribed range 202 close to the observation point, the display of the vicinity 203 of the observation point centering on the "bridge" as the information of the high content level is stopped, and is returned to the normal information display at the low content level. Accordingly, only when the user continuously observes the portion of the "bridge" that the user is interested in for the prescribed period of time or longer, the vicinity of the observation point centering on the observed "bridge" can be displayed as the information of the high content level, and can be visually recognized uniformly with a high-quality image and a high definition.

Next, a modification example of the image display method in this example will be described. FIG. 3A to FIG. 3E are diagrams appearance-schematically illustrating another image display method of the HMD in this example. In FIG. 3A to FIG. 3E, the same reference numerals will be applied to the same operations as those in FIG. 1A to FIG. 1F, and the detailed description thereof will be omitted.

Figure 3A:
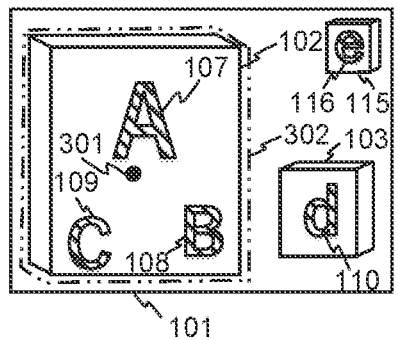
FIG. 3A to FIG. 3E are diagrams illustrating another image display method in Example 1.
Figure 3B:
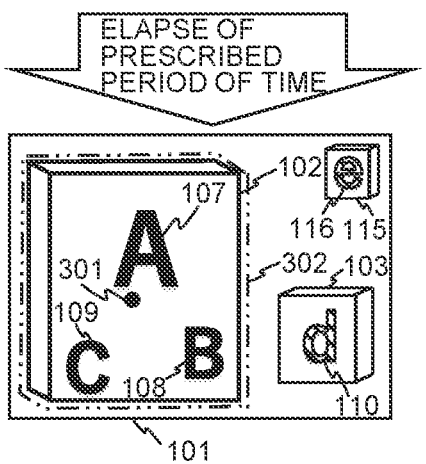

FIG. 3A illustrates that the user starts to observe an observation point 301 that the user is interested in by placing the observation point on the surface of the object 102 in a state where the image within the visual field display range 101 is displayed as the information of the low content level. In a case where the observation point 301 stays within a display range 302 of the object 102 in which the observation point 301 is positioned for a prescribed period of time or longer, as illustrated in FIG. 3B, the image of the object 102 is displayed by being changed to the information of the high content level from the state of the normal times in which the information is displayed at a low content level within the entire visual field display range. FIG. 3B illustrates that the letters 107, 108, and 109 seen on the surface of the object 102 are represented by a fill display, the outline of the object 102 is represented by a bold solid line from a thin solid line, and the information is displayed at a high content level. Accordingly, in a case where the user continuously observes within the display range of the object in which the observation point is positioned for the prescribed period of time or longer, it is detected and determined that the user has the interest or the intention for observing the object, and only in a case where the user has the interest or the intention of the observation, the image of the entire object that the user is interested in can be displayed uniformly as the information of the high content level with a high-quality image and a high definition. That is, by setting a range in which the information is displayed at a high content level as object unit, it is possible to uniformly display the inside of the object. Further, in a case where the user does not continuously observe within the display range of the object for the prescribed period of time or longer, and it is detected and determined that the user has no interest or the intention of the observation, the generating of the unnecessary calculation load for displaying the information at a high content level can be eliminated.

Figure 3C:
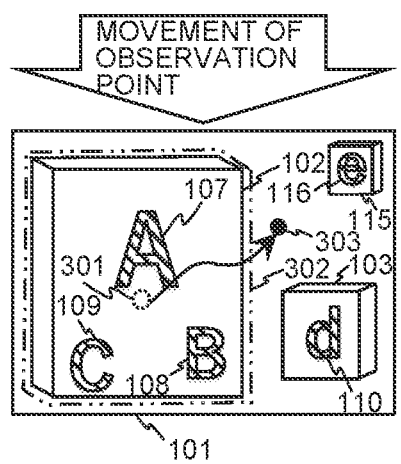

After that, as illustrated in FIG. 3C, in a case where the observation point 301 is moved, for example, to an observation point 303 deviating from the display range 302 of the object 102, the image of the object 102 displayed as the information of the high content level is returned to the original information display at the low content level. Accordingly, only when the user continuously observes within the display range of the object for the prescribed period of time or longer, the image of the object for which the user has the interest or the intention of the observation can be displayed uniformly as the information of the high content level with a high-quality image and a high definition.

Accordingly, in a case where the user has no interest or intention of the observation by optimally considering the prescribed period of time for the continuous observation, the information is not unnecessarily displayed at a high content level, and the generating of the unnecessary calculation load resulting from the high-quality image process is suppressed and eliminated, and only in a case where the user has the interest or the intention of the observation, the inside of the object can be conveniently displayed uniformly with a high-quality image and a high definition by setting the object for which the user has the interest or the intention as a unit.

Next, the information content level at each position of the display screen within the visual field display range 101 will be described. As with FIG. 1D and FIG. 1E, FIG. 3D and FIG. 3E illustrate that the level of information content at each position is indicated on the vertical axis by placing the display screen within the visual field display range 101 on the horizontal plane axis.

Figure 3D:
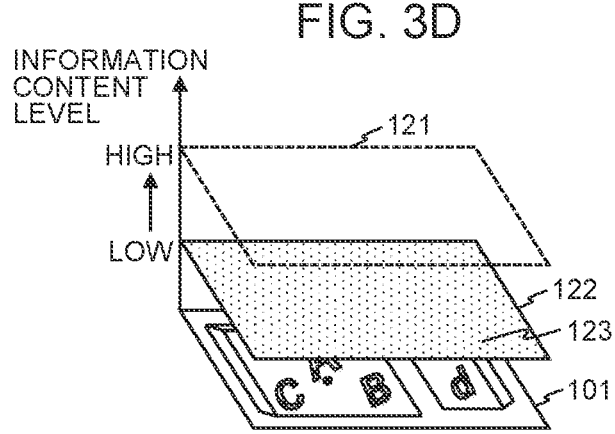
Figure 3E:
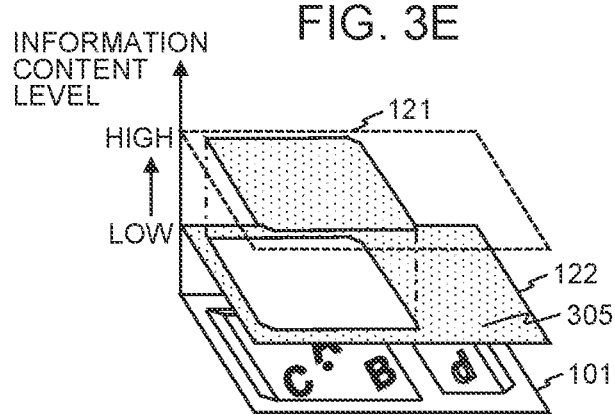

When the observation point does not stay within the display range 302 of the object 102 for the prescribed period of time or longer, in a state as illustrated in FIG. 3A, the information content at each position of the display screen, as illustrated in FIG. 3D as with FIG. 1D, is the information display at the low content level on the hatched plane 123 over the entire range within the visual field display range 101. On the other hand, when the observation point stays within the display range 302 of the object 102 for the prescribed period of time or longer, in a state as illustrated in FIG. 3B, as illustrated in FIG. 3E, an information content at each position within the display range 302 of the object 102 is the information display at the high content level on a hatched plane region 304, and an information content at each position deviating from the display range 302 of the object 102 is the information display at the low content level on a hatched plane region 305. Accordingly, in a case where the user continuously observes the display range of the object for the prescribed period of time or longer, only the image of the object for which the user has the interest or the intention of the observation can be displayed uniformly as the information of the high content level with a high-quality image and a high definition.

Figure 4A:
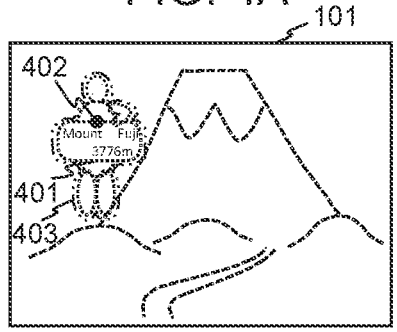
FIG. 4A to FIG. 4C are diagrams illustrating a specific example of FIG. 3A to FIG. 3E.
Figure 4B:
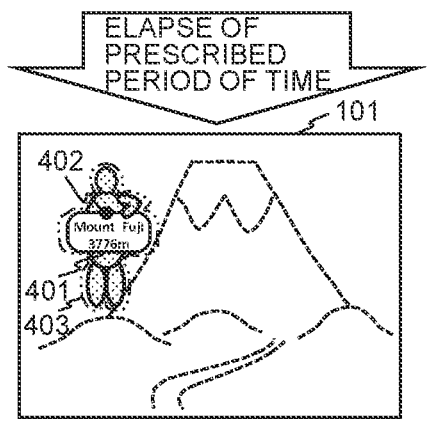
Figure 4C:
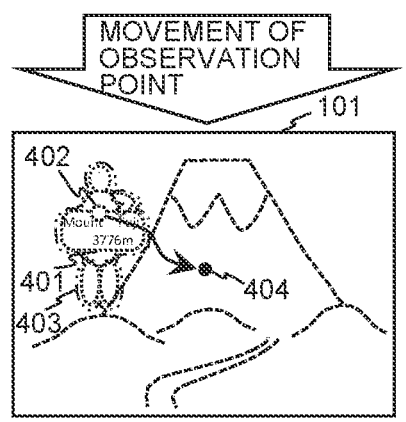

FIG. 4A to FIG. 4C illustrate a specific example of the image display method illustrated in FIG. 3A to FIG. 3E. In FIG. 4A to FIG. 4C, an optical see-through type HMD is illustrated in which the real object in front of the eyes can be visually recognized by the user while the virtual object is displayed on a display provided in front of the head. In FIG. 4A, the landscape of the mountain and a description panel 401 indicating the altitude of the mountain that is the virtual object are illustrated within the visual field display range 101, and in normal times, the information is displayed at a low content level within the entire visual field display range (illustrated by a dotted line). In such a state, when the user 10 continuously observes the description panel 401 with interest, and an observation point 402 stays within a display range 403 of the description panel for a prescribed period of time or longer, as illustrated in FIG. 4B, the entire description panel 401 is displayed as the information of the high content level (illustrated by a solid line, hatching, and boldface). After that, as illustrated in FIG. 4C, in a case where the observation point is moved, for example, to an observation point 404 deviating from the display range 403 of the description panel 401, the display of the entire description panel 401 as the information of the high content level is stopped, and is returned to the normal information display at the low content level. Accordingly, only when the user continuously observes the virtual object that the user is interested in for the prescribed period of time or longer, the entire image of the observed virtual object can be displayed as the information of the high content level, and can be visually recognized uniformly with a high-quality image and a high definition.

Figure 5A:
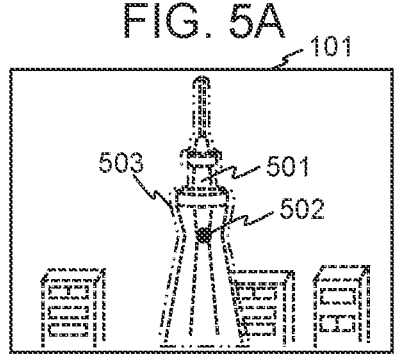
FIG. 5A to FIG. 5C are diagrams illustrating another specific example of FIG. 3A to FIG. 3E.
Figure 5B:
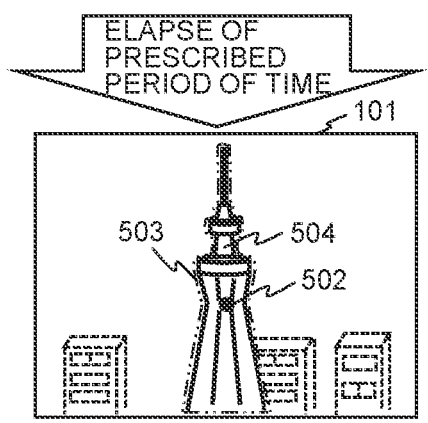
Figure 5C:
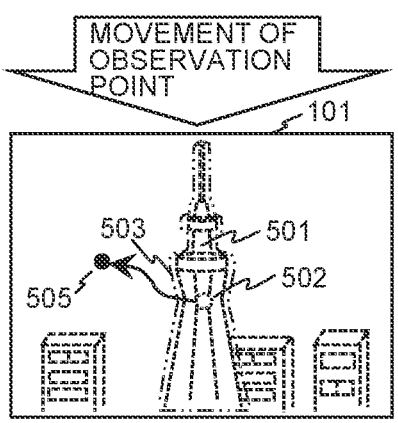

FIG. 5A to FIG. 5C illustrates another specific example of the image display method illustrated in FIG. 3A to FIG. 3E. In FIG. 5A to FIG. 5C, a video see-through type HMD displaying the real object in the reality space or the virtual object on the display provided in front of the head is illustrated. In FIG. 5A, a tower 501 and the captured landscape that is the surrounding building are illustrated within the visual field display range 101, and in normal times, the information is displayed at a low content level within the entire visual field display range (illustrated by a dotted line). In such a state, when the user 10 continuously observes the tower 501 with interest, and an observation point 502 stays within a display range 503 of the tower 501 for a prescribed period of time or longer, the tower 501 is cut out from a captured image of the landscape by image analysis to generate a real object 504 including the tower, and as illustrated in FIG. 5B, the entire real object 504 is displayed as the information of the high content level (illustrated by a bold solid line). After that, as illustrated in FIG. 5C, in a case where the observation point is moved, for example, to an observation point 505 deviating from the display range 503 of the real object 504, the display of the entire real object 504 as the information of the high content level is stopped, and the tower 501 is returned to the normal information display at the low content level. Accordingly, only when the user continuously observes a specific target within the captured image with interest for the prescribed period of time or longer, the entire image of the real object of the specific target cut out from the captured image by the image analysis can be displayed uniformly as the information of the high content level, and can be visually recognized uniformly with a high-quality image and a high definition.

Figure 6:
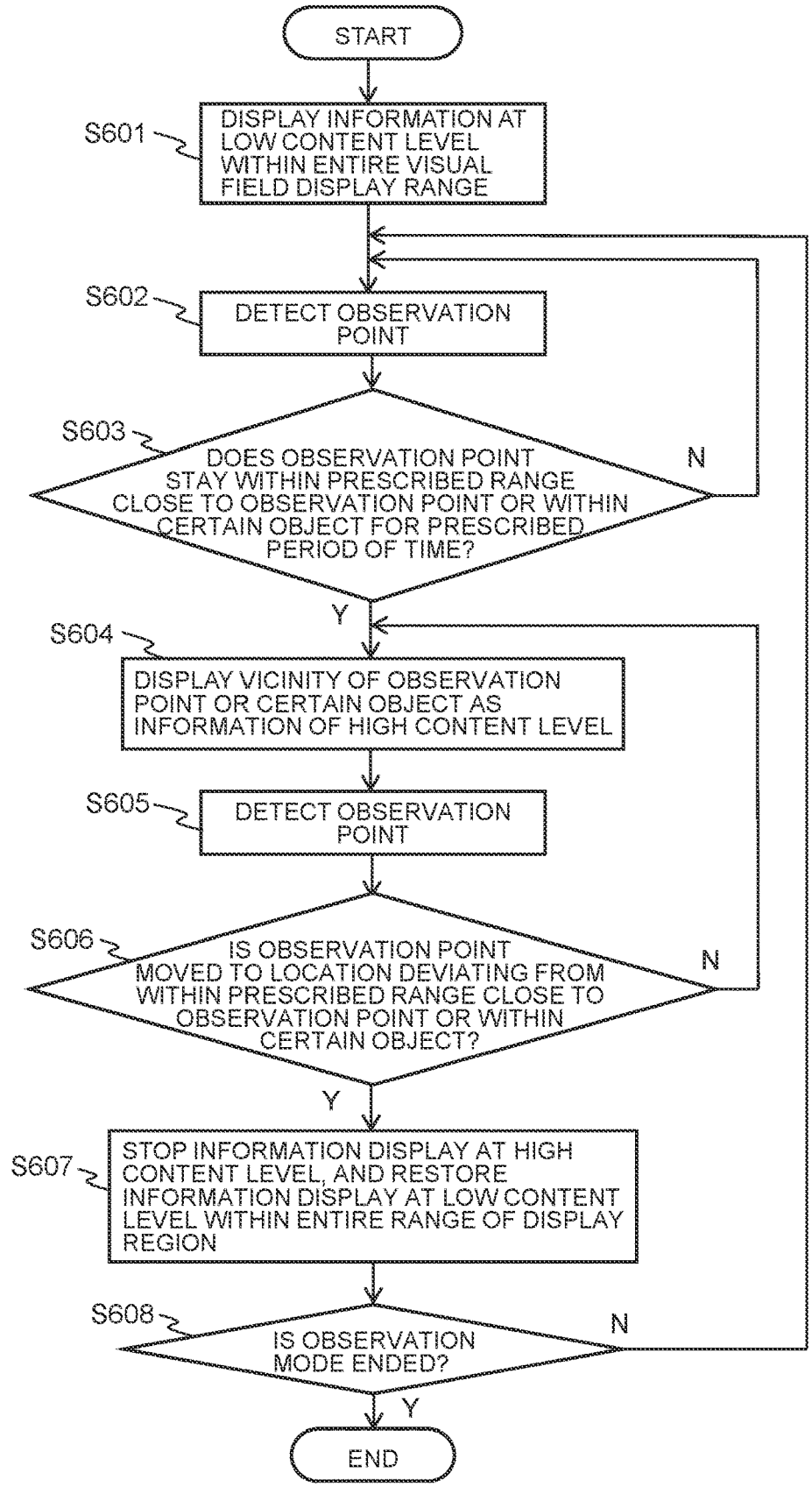
FIG. 6 is a process flowchart illustrating a basic operation of the image display method in Example 1.

FIG. 6 is a process flowchart illustrating the basic operation of the image display method of the HMD in this example. In FIG. 6, in the state of the normal times in which the information is displayed at a low content level within the entire visual field display range (S601), the observation point that the user observes is detected by detecting visual lines of the both eyes of the user (S602), and whether the detected observation point stays within prescribed display range close to the observation point or within the display range of a certain object for the prescribed period of time is determined (S603). In a case where the observation point stays within the prescribed display range close to the observation point or within the display range of the certain object for the prescribed period of time, the vicinity of the observation point or the certain object is displayed as the information of the high content level (S604). In a case where the observation point does not stay within the prescribed display range close to the observation point or within the display range of the certain object for the prescribed period of time, the observation point is continuously detected until the observation point stays within the prescribed display range close to the observation point or within the certain object for the prescribed period of time (S602 and S603). In a state where the vicinity of the observation point or the certain object is displayed as the information of the high content level, the observation point that the user observes is continuously detected (S605), and whether that the observation point is changed to be moved to a location deviating from within the prescribed display range close to the observation point or within the display range of the certain object is determined (S606). In a case where the observation point is moved to the location deviating from within the prescribed display range close to the observation point or within the display range of the certain object, the display of the vicinity of the observation point or the certain object as the information of the high content level is stopped, and the entire visual field display range is restored to the information display at the low content level (S607). On the other hand, in a case where the observation point is not moved to the location deviating from within the prescribed display range close to the observation point or within the display range of the certain object, the vicinity of the observation point or the certain object is continuously displayed as the information of the high content level (S606 and S604). Then, in step S608, the entire visual field display range is restored to the information display at the low content level (S607), and then, in a case where the user further continues an observation mode, the process returns to the detection of the observation point in S602, and when the user does not continue the observation mode, the process ends.

According to the operation described above, only when the user continuously observes within the prescribed display range close to the observation point or within the display range of the certain object for the prescribed period of time or longer, the image of the vicinity of the observation point or the image of the object for which the user has the interest or the intention of the observation can be displayed uniformly as the information of the high content level with a high-quality image and a high definition. Note that, in the above description, the HMD confirms a display target displayed as the information of the high content level by an anchoring observation time for which the detected observation point stays, and a modification example according to another method will be described below.

Figure 7:
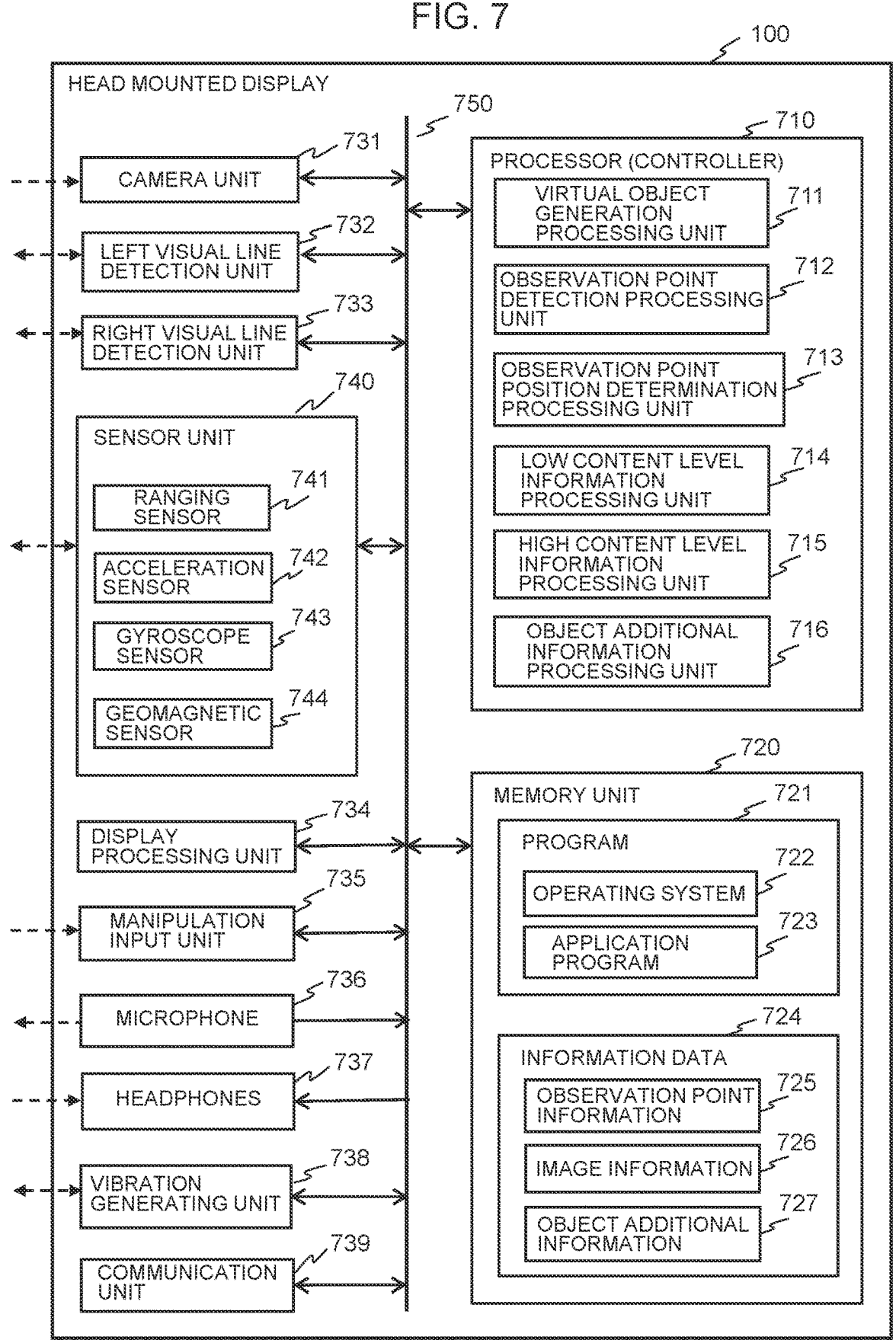
FIG. 7 is a functional block diagram of an image display device in Example 1.

Next, the configuration of the HMD in this example will be described. FIG. 7 is a functional block diagram illustrating a configuration example of the HMD in this example. Note that, even in the case of an image display device other than the HMD, the configuration is basically the same. Further, some constituents may be mounted in different housings.

In FIG. 7, the HMD 100 is configured by suitably using a processor 710, a memory unit 720, a camera unit 731, a left visual line detection unit 732, a right visual line detection unit 733, a display processing unit 734, a manipulation input unit 735, a microphone 736, headphones 737, a vibration generating unit 738, a communication unit 739, and a sensor unit 740, and the constituents are connected to each other through a bus 750.

The processor 710 executes a software process according to an operating system (OS) 722 stored in the memory unit 720 as a control program 721 or an application program 723 for operation control, and thus, is configured as a controller controlling each constituent of the HMD 100, and attains the function of the OS, middleware, an application, or the like, or other functions.

The memory unit 720 includes a non-volatile storage device or the like, and stores various programs 721 or information data 724 handled by the processor 710 or the like. As the information data 724, observation point information 725 indicating the position or the like of the observation point that the user 10 observes, image information 726 of the vicinity of the observation point or the object that the user 10 observes, additional information 727 associated with the object, and the like are stored.

The camera unit 731 captures the state of a visual range or a visual field in the surrounding of the front side, and acquires an image by converting light incident from a lens into an electrical signal with an imaging element. In the video see-through type HMD, the real object within the visual field in the surrounding of the front side is captured by the camera unit 731, and the captured image of the real object is displayed on a display of the display processing unit 734, compared to the optical see-through type HMD in which the user 10 directly visually recognizes the real object within the visual field in the surrounding of the front side.

The left visual line detection unit 732 and the right visual line detection unit 733 each detect the visual line by capturing the movement or the direction of the left eye and the right eye. Note that, in a process of detecting the visual line, a known technology generally used as an eye-tracking process may be used, and for example, in a method for using corneal reflection, a technology is known in which an infrared light emitting diode (LED) is applied to the face and captured by an infrared camera, and the visual line is detected on the basis of the position of the pupil with respect to the position of the corneal reflection by setting the position of the reflected light on the cornea (the corneal reflection) due to the infrared LED irradiation as a reference point. In addition, a method is also known in which the eyes are captured by a visible camera, and the visual line is detected on the basis of the position of the iris with respect to the inner corner of the eye by setting the inner corner of the eye as a reference point and the iris as a moving point. An intersection point at which the visual line of the left eye that is detected by the left visual line detection unit 732 and the visual line of the right eye that is detected by the right visual line detection unit 733 intersect with each other is the observation point that the user 10 observes.

In the case of the optical see-through type HMD, for example, the display processing unit 734 includes a projection unit that projects the virtual object, notification information to the user, or the like, and a transparent half mirror that forms an image of the projected virtual object or the like and displays the image in front of the eyes. Accordingly, the user is capable of visually recognizing the real object within the visual range display range in front of the eyes and the virtual object of which the image is formed together in a form where the virtual object is floating. In addition, in the case of the video see-through type HMD, the HMD includes a display displaying the real object in front of the eyes that is captured by the camera unit 731, the virtual object, and the like together, such as a liquid crystal panel. Accordingly, the user 10 is capable of visually recognizing the real object within the visual field in front of the eyes, the virtual object, and the like in an overlapping manner by using the HMD 100.

The manipulation input unit 735, for example, is an input unit such as a keyboard, keybutton, or a touch key, and sets and inputs information that the user desires to input. The manipulation input unit 735 may be provided at a position or in a form in which the user easily performs an input manipulation in the HMD, or may be in a form in which the manipulation input unit is separated from the main body of the HMD and is connected to the HMD in a wired or wireless manner. In addition, an input manipulation screen is displayed in a display screen of the display processing unit 734, and input manipulation information may be acquired by a position on the input manipulation screen to which the visual line detected by the left visual line detection unit 732 and the right visual line detection unit 733 is directed, or the input manipulation information may be acquired by displaying a pointer on the input manipulation screen and by manipulating the pointer with the manipulation input unit 735. In addition, the input manipulation information may be acquired by the user producing a sound indicating the input manipulation and by the microphone 736 collecting the sound.

The microphone 736 collects an external sound or the sound produced by the user oneself. Instruction information according to the sound production from the user can be acquired in the HMD, and an operation with respect to the instruction information can be conveniently executed.

The headphones 737 are worn on the ears of the user to hear a sound to the user, and enable the user to notice the notification information with the sound. The vibration generating unit 738 generates a vibration by the control from the processor 710, and converts the notification information to the user that is transmitted by the HMD into the vibration. The vibration generating unit 738 is capable of reliably transmitting the notification to the user by generating the vibration in the head of the user on which vibration generating unit is closely worn. Examples of the notification information to the user include time for which the observation point stays within a certain display target or a notification when the observation point stays within a target that the user is interested in for a prescribed period of time, a notification for notifying a change in an information content display mode or a notification for the change contents, and the like, and thus, the convenience can be improved.

The communication unit 739 is a communication interface performing wireless communication or wired communication with other information terminals in the vicinity thereof by near field communication, a wireless LAN, or base station communication, and includes a communication processing circuit corresponding to prescribed various communication interfaces, an antenna, and the like. The communication unit 739, for example, performs wireless communication with an external information server 130. Note that, the near field communication, for example, is performed by using an electronic tag, but is not limited thereto, and insofar as at least the wireless communication can be performed in a case where the HMD is near the other information terminal, the near field communication may be performed by using a wireless LAN such as Bluetooth (Registered Trademark), infrared data association (IrDA, Registered Trademark), Zigbee (Registered Trademark), home radio frequency (HomeRF, Registered Trademark), and Wi-Fi (Registered Trademark). In addition, as the base station communication, long-distance communication such as wideband code division multiple access (W-CDMA, Registered Trademark) or global system for mobile communications (GSM) may be used. Note that, even though it is not illustrated, in the communication unit 739, other methods such as optical communication and communication using an acoustic wave may be used as the means for wireless communication. In this case, light emitting/receiving units and acoustic wave output/input units are used instead of a transmitting/receiving antenna, respectively. In addition, in the case of handling a high-definition video or the like, the amount of data to be used is exponentially large, and in such a case, a high-speed and large-capacity communication network such as 5th generation (5G: the fifth generation mobile communication system) and local 5G may be used in wireless communication, and thus, the convenience can be improved.

A ranging sensor 741 is a sensor measuring a distance between the HMD 100 and an external real object. As the ranging sensor 741, a time of flight (TOF) type sensor may be used, or a stereo camera or other types of sensors may be used. Three-dimensional arrangement information of the external real object is grasped, and display with the virtual object reflecting a shielding relationship with the real object is performed. In addition, arrangement data of the external real object including a real object shielded on the basis of several feature points of the external real object may be referred to. Such arrangement data may be acquired from the external information server 130 or the like.

An acceleration sensor 742 is a sensor detecting an acceleration that is a change in a velocity per unit time, and is capable of grasping a movement, a vibration, an impact, or the like. In addition, a gyroscope sensor 743 is a sensor detecting an angular velocity in a rotation direction, and is capable of grasping the state of a vertical, horizontal, or oblique posture. Accordingly, the movement of the head of the user 10 wearing the HMD 100 can be detected by using the acceleration sensor 742 and the gyroscope sensor 743 mounted on the HMD 100. A geomagnetic sensor 744 is a sensor detecting a magnetic force of the earth, and detects a direction to which the HMD 100 is directed. By grasping a geomagnetic change with respect to the movement of the head using a triaxial type geomagnetic sensor detecting geomagnetism in an up-down direction in addition to a front-back direction and a right-left direction, it is also possible to detect the movement of the head. Accordingly, a movement fluctuation of the head of the user wearing the HMD can be detected in detail.

A virtual object generation processing unit 711 generates the virtual object that is an object in a virtual space different from the reality space. Note that, a virtual object generated by the external information server 130 or the like may be acquired in the HMD 100 by the wireless communication.

An observation point detection processing unit 712 generates the intersection point as the observation point that the user 10 observes, from the visual line of the left eye that is detected by the left visual line detection unit 732 and the visual line of the right eye that is detected by the right visual line detection unit 733.

An observation point position determination processing unit 713 determines the position of the observation point detected by the observation point detection processing unit 712, and determines whether the observation point stays within a certain range for a prescribed period of time or whether the observation point is moved to a position deviating from the certain range.

In an information content level of an image that is determined from a factor such as a definition, a gradation, and an update rate (the number of updates per unit time), a low content level information processing unit 714 changes an image to be a target to the information of the low content level and maintains the change, and a high content level information processing unit 715 changes the image to be the target to the information of the high content level and maintains the change. For example, the image is expressed as the information of the high content level as the definition, the gradation, and the update rate increase.

An object additional information processing unit 716 processes the additional information associated with the object, and for example, processes a shielded internal structure of the object to be visible as the additional information.

According to the configuration described above, in the initial state of the normal times, the image within the entire visual field display range is processed as the information of the low content level by the low content level information processing unit 714, and the information is displayed at a low content level by the display processing unit 734. From such a state, whether the observation point detected by the observation point detection processing unit 712 stays within the display range close to the observation point or within the certain object for the prescribed period of time is determined by the observation point position determination processing unit 713. As a result of the determination by the observation point position determination processing unit 713, in a case where the observation point stays within the display range close to the observation point or within the certain object for the prescribed period of time, the image of the vicinity of the observation point or the object is processed to the information of the high content level by the high content level information processing unit 715, and the information is displayed at a high content level by the display processing unit 734. After that, whether the observation point detected by the observation point detection processing unit 712 is moved to the outside from within the display range close to the observation point or within the certain object is determined by the observation point position determination processing unit 713. As a result of the determination by the observation point position determination processing unit 713, in a case where the observation point is moved to the outside from within the display range close to the observation point or within the certain object, the image of the vicinity of the observation point or the object is processed to the information of the low content level by the low content level information processing unit 714, and the information is displayed at a low content level by the display processing unit 734.

Accordingly, in a case where the user has no interest or intention of the observation by optimally considering the prescribed period of time for the observation, the high content level information process is not unnecessarily performed, and the generating of the unnecessary calculation load is suppressed and eliminated, and only when the user continuously observes within the prescribed display range close to the observation point or within the display range of the certain object for the prescribed period of time or longer, the entire image of the vicinity of the observation point or the entire image of the object for which the user has the interest or the intention of the observation can be displayed uniformly as the information of the high content level with a high-quality image and a high definition.

As described above, according to this example, in a case where the user has no interest or intention of the observation, the generating of the unnecessary calculation load resulting from the high-quality image process is suppressed, whereas in a case where the user has the interest or the intention of the observation, the display range or the object for which the user has the interest or the intention is displayed uniformly with a high-quality image and a high definition, and thus, the image display device and the display method for addressing the interest of the user while eliminating the unnaturalness and having excellent convenience.

EXAMPLE 2

Figure 8:
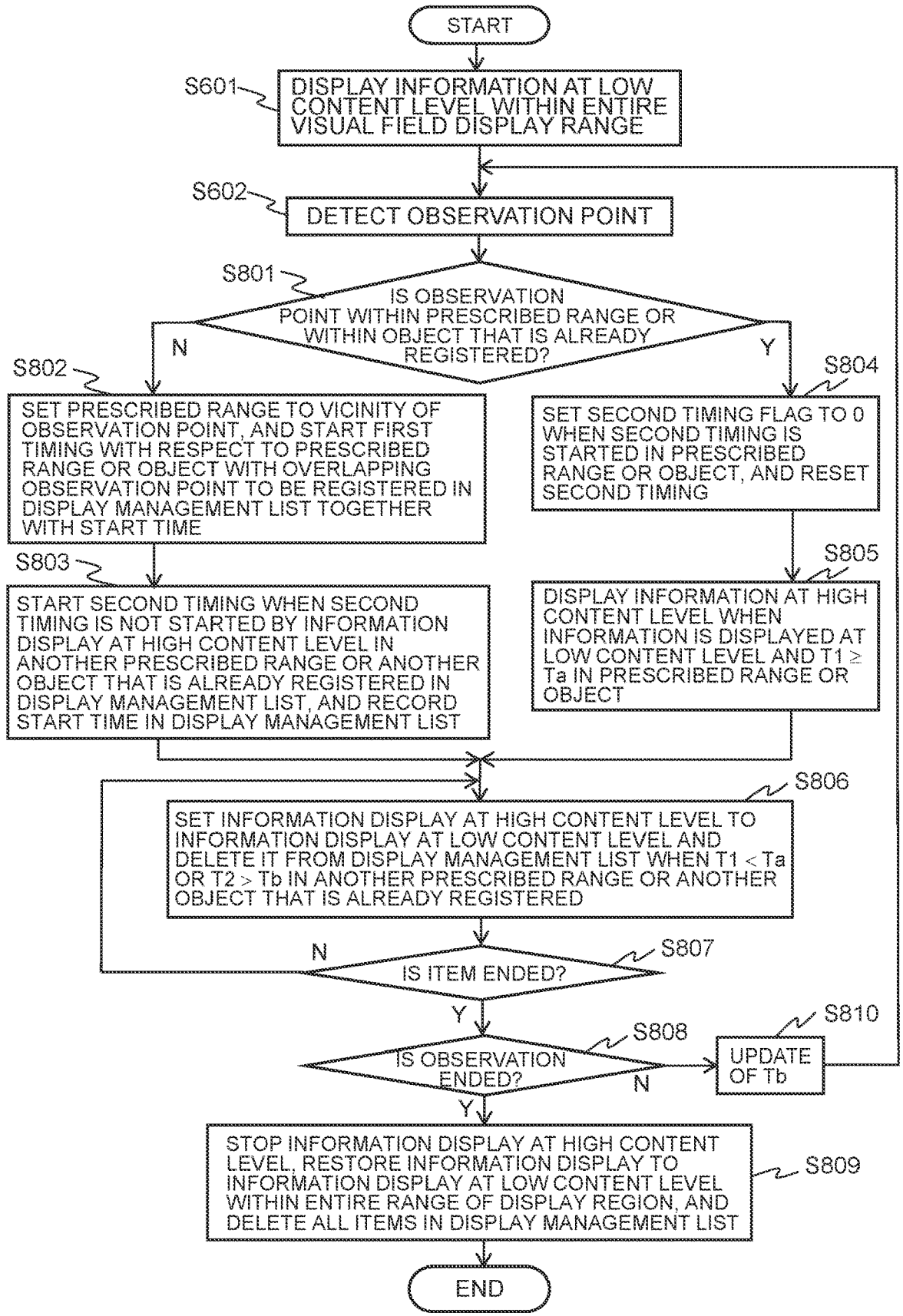
FIG. 8 is a process flowchart illustrating an operation of an image display method in Example 2.

FIG. 8 is a process flowchart illustrating the operation of an image display method of a HMD in this example. In addition, FIG. 9 is a display management list used in display control in this example.

In FIG. 9, in the display management list, information of the prescribed range of the vicinity of the observation point or the object to be a control target for a display level is registered, and includes identification information (ID) of the prescribed range or the object, a first timing start time (T1 Start), a second measurement flag (T2 Flag), and a second timing start time (T2 Start). Here, the first timing is time measurement for measuring the elapsed time from the start of the observation for the prescribed range or the object. The elapsed time of the first timing is set to a first elapsed time (T1). The second timing is time measurement for measuring the elapsed time from a time point when the observation point has deviated from the range of the vicinity region of the prescribed range or the object after the prescribed range or the object is displayed as high level information. The elapsed time of the second timing is set to a second elapsed time (T2) While the second timing is performed, a second timing flag is set to 1. In a case where the second timing is not performed, the second timing flag is set to 0. Note that the first timing is always performed in the prescribed range or the object registered in the display management list.

In FIG. 8, the same reference numerals will be applied to the same operations as those in FIG. 6, and the detailed description thereof will be omitted. In FIG. 8, first, as with FIG. 6, the image display device starts a display control mode by the observation from the state of the normal times in which the information is displayed at a low content level within the entire visual field display range (S601). The image display device continuously detects the observation point that the user observes by detecting the visual lines of the both eyes of the user (S602). Then, the image display device determines whether the observation point is within the prescribed range or within the object that is already registered in the display management list of FIG. 9 (S801). In the case of "No" in S801, the image display device sets the prescribed range to the vicinity of the observation point, and starts the first timing with respect to the prescribed range or the object with an overlapping observation point. Then, the prescribed range or the object is recorded in the display management list together with the identification information and the first timing start time, and the second timing flag is set to 0 (S802). Here, the prescribed range is set by a shape or a size set in advance, such as a circle or a quadrangle, in the vicinity of the position of the observation point detected herein. Next, in a case where the second timing is not started by the information display at the high content level in another prescribed range or another object that is already registered in the display management list, the image display device starts the second timing, sets the second timing flag to 1, and records the start time in the display management list (S803). Next, in the case of T1<Ta or T2>Tb in another prescribed range or another object that is already registered, the image display device sets the information display at the high content level to the information display at the low content level and deletes it from the display register management list (S806). Here, Ta is the prescribed period of time for the continuous observation for switching to the information display at the high content level, and the case of T1<Ta is a case where the observation point is moved to another portion before the vicinity of the prescribed range or the object of the target is switched to the information display at the high content level. In addition, Tb is the prescribed period of time for switching to the information display at the low content level after the observation point is moved, and the case of T2>Tb is a case where the vicinity of the prescribed range or the object of the target is displayed as the information of the high content level, and then, the observation point is moved to another portion, and a retention time Tb for the information display at the high content level is exceeded. The image display device performs the process of S806 with respect to all the items in the display management list (S807).

In the case of "Yes" in S801, when the second timing is started in the prescribed range or the object with an overlapping observation point that is already registered, the image display device sets the second timing flag to 0, and resets the second timing (S804). Next, in a case where the information is displayed at a low content level and T1 Ta in the prescribed range or the object, the image display device displays the information at a high content level (S805). After that, the image display device performs the process of S806 and S807. Then, the image display device checks whether there is an end instruction for the display control mode by the observation from the user (S808), and continues the control in a case where there is no end instruction ("No" in S808). Note that, in a case where the value of Tb is changed in accordance with the number of targets displayed as the information of the high content level (FIG. 13), as described below, the image display device updates the value (S810). In a case where there is the end instruction from the user ("Yes" in S808), the image display device stops the information display at the high content level, restores the information display to the information display at the low content level within the entire range of the display region, deletes all the items in the display management list (S809), and ends the display control mode.

According to the operation described above, when the user continuously observes within the prescribed display range close to the observation point or within the display range of the certain object for the prescribed period of time Ta or longer, the image of the vicinity of the observation point or the image of the object for which the user has the interest or the intention of the observation is displayed uniformly as the information of the high content level with a high-quality image and a high definition, whereas when the observation point is moved to the location deviating from within the prescribed display range close to the observation point or within the display range of the certain object and continuously stays for the prescribed period of time Tb or longer, the image of the vicinity of the observation point or the image or the object is restored to the original information display at the low content level from the information display at the high content level.

Accordingly, it is possible to reduce or eliminate a problem that when the user desires to observe carefully a plurality of objects or the vicinity of a plurality of observation points with interest or intention, the information content display mode is changed as soon as the visual line is removed, and the information content display mode is frequently switched, and thus, the user has a difficulty in viewing.

FIG. 10A to FIG. 10E, FIG. 11A to FIG. 11D, FIG. 12A to FIG. 12E are diagrams more specifically illustrating an operation example illustrated in FIG. 8. Note that, FIG. 10A to FIG. 10E, FIG. 11A to FIG. 11D and FIG. 12A to FIG. 12E are explanatory diagrams in a case where the same range for the information display at the high content level as that in FIG. 3A to FIG. 3E is set to object unit, and the same vicinity of the observation point as that in FIG. 1A to FIG. 1F may be set as the range for the information display at the high content level. In FIG. 10A to FIG. 10E, FIG. 11A to FIG. 11D, and FIG. 12A to FIG. 12E, the same reference numerals will be applied to the same operations as those in FIG. 1A to FIG. 1F and FIG. 3A to FIG. 3E, the detailed description thereof will be omitted.

Figure 10A:
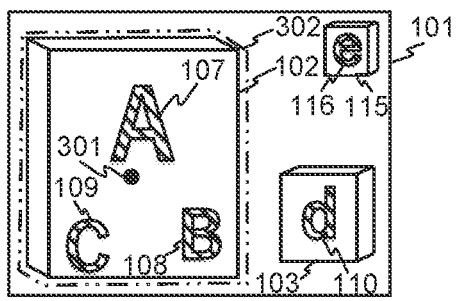
FIG. 10A to FIG. 10E are diagrams illustrating the image display method in Example 2.
Figure 10B:
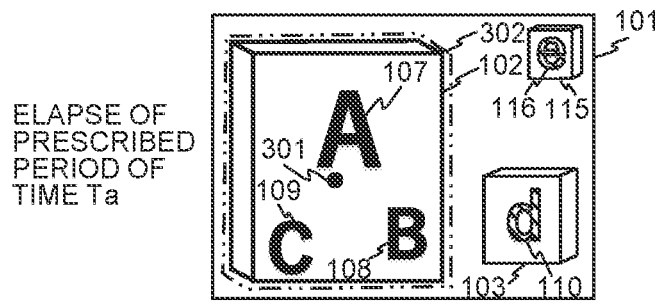
Figure 10C:
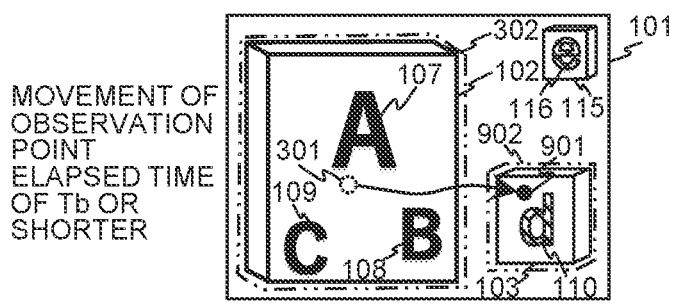
Figure 10D:
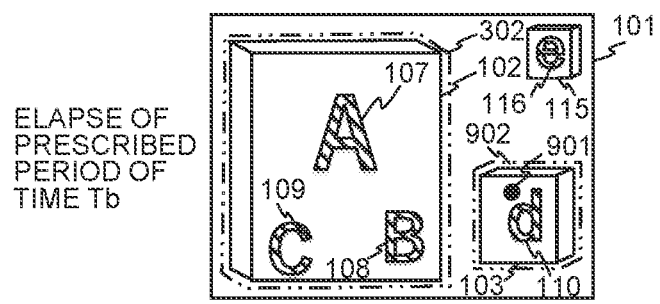
Figure 10E:
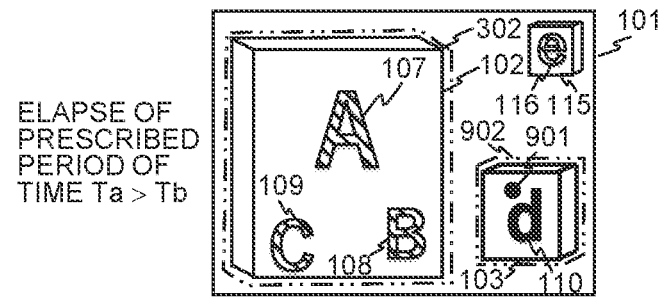

In FIG. 10A to FIG. 10E, as with FIG. 3A and FIG. 3B, FIG. 10A and FIG. 10B illustrate that in a case where the observation point 301 stays within the object 102 for the prescribed period of time Ta or longer, the inside of the display range 302 of the object 102 is displayed as the information of the high content level. After that, when the observation point is moved, for example, to an observation point 901 within the object 103 from within the object 102, as illustrated in FIG. 10C, the inside of the display range 302 of the object 102 is continuously displayed as the information of the high content level until the prescribed period of time Tb (<Ta) elapses after the observation point is moved. Accordingly, even in a case where the observation point is moved, the information content display mode of the object that the user has previously observed is not changed, and the user does not have a feeling of strangeness or a feeling of unexpectedness on the display within the visual field display range that the user is looking at. In a case where the prescribed period of time Tb elapses after the observation point is moved, as illustrated in FIG. 10D, the inside of the display range 302 of the object 102 is displayed as the information of the low content level. Further, in a case where the prescribed period of time Ta (>Tb) elapses after the observation point is moved, as illustrated in FIG. 10E, the inside of a display range 902 of the object 103 is displayed as the information of the high content level. Accordingly, when the observation point is moved to the object 103 from the object 102, as illustrated in FIG. 10C to FIG. 10E, the information content display mode is smoothly changed without the user having a feeling of unexpectedness, and it is possible to reduce a difficult in viewing for the user.

Figure 11A:
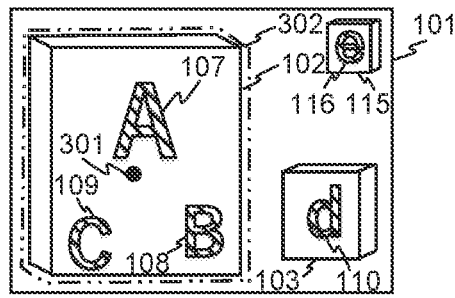
FIG. 11A to FIG. 11D are diagrams illustrating the image display method in Example 2.
Figure 11B:
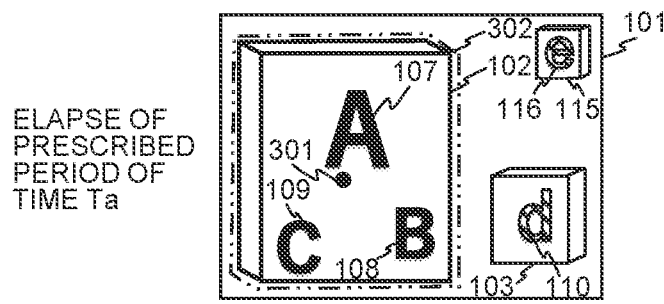
Figure 11C:
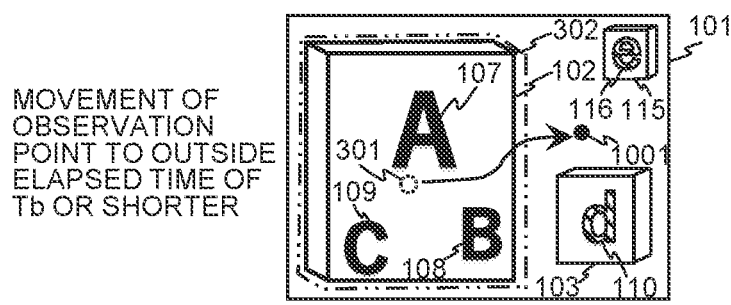
Figure 11D:
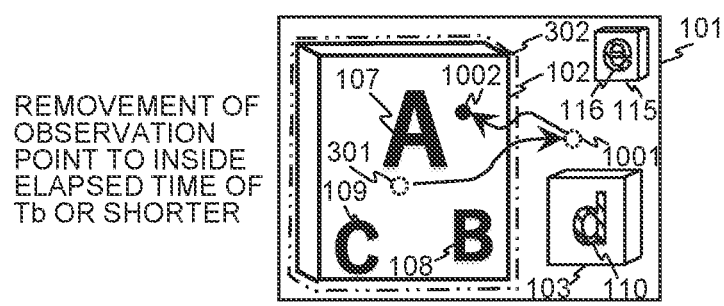

In FIG. 11A to FIG. 11D, as with FIG. 10A and FIG. 10B, FIG. 11A and FIG. 11B illustrate in a case where the observation point 301 stays within the object 102 for the prescribed period of time Ta or longer, the inside of the display range 302 of the object 102 is displayed as the information of the high content level. After that, as illustrated in FIG. 11C, once the observation point is moved to the outside of the object, for example, an observation point 1001, from within the object 102, the inside of the display range 302 of the object 102 is continuously displayed as the information of the high content level until the prescribed period of time Tb elapses after the observation point is moved. In this case, as illustrated in FIG. 11D, in a case where the observation point is returned again to within the object 102, for example, an observation point 1002, for the prescribed period of time Tb, the inside of the display range 302 of the object 102 is continuously displayed as the information of the high content level. Accordingly, even in a case where the observation point is accidentally moved for a moment or for a brief while from the target such as the object that the user observes with interest or intention, the target such as the object can be continuously displayed as the information of the high content level, a rapid change in the information content display mode of the object can be excluded, and a difficulty in viewing for the user can be reduced.

Figure 12A:
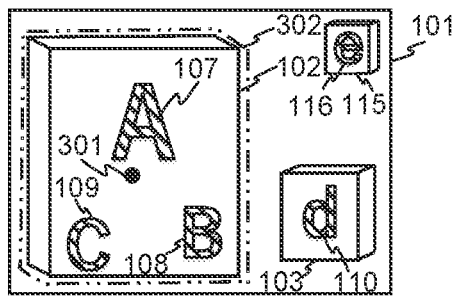
FIG. 12A to FIG. 12E are diagrams illustrating the image display method in Example 2.
Figure 12B:
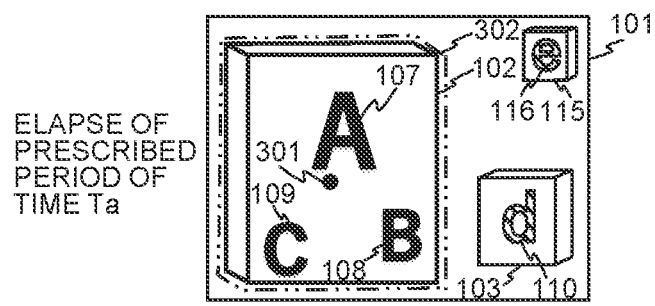
Figure 12C:
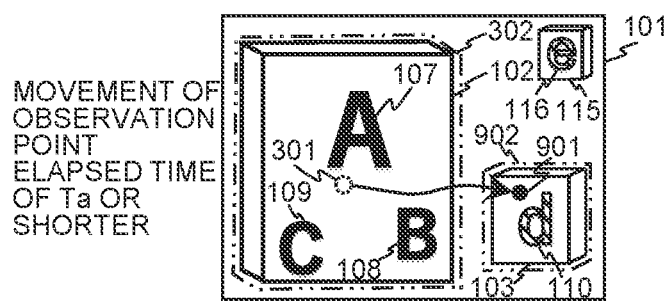
Figure 12D:
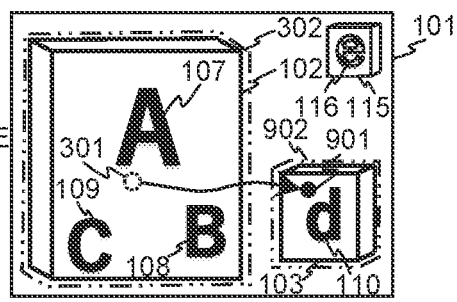
Figure 12E:
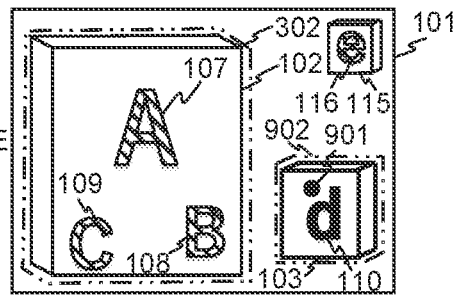

FIG. 12A to FIG. 12E are examples of a case where the prescribed period of time Tb for which the observation is not performed is longer than the prescribed period of time Ta for which the observation is performed, compared to a case illustrated in FIG. 10A to FIG. 10E. FIG. 12A and FIG. 12B are the same as FIG. 10A and FIG. 10B, in which as illustrated in FIG. 12C, as with a case illustrated in FIG. 10C, the inside of the display range 302 of the object 102 is displayed as the information of the high content level until the prescribed period of time Ta elapses after the observation point is moved to within the object 103, for example, an observation point 901, but when the elapsed time is the prescribed period of time Ta or longer and the prescribed period of time Tb or shorter after the observation point is moved, as illustrated in FIG. 12D, the inside of the display range 302 of the object 102 is continuously displayed as the information of the high content level, and the inside of the display range 902 of the object 103 to which the observation point is moved is displayed as the information of the high content level. After that, in a case where the elapsed time after the observation point is moved is the prescribed period of time Tb or longer, as illustrated in FIG. 12E, the inside of the display range 302 of the object 102 is changed to the information display at the low content level, and the inside of the display range 902 of the object 103 to which the observation point is moved is continuously displayed as the information of the high content level. Accordingly, in a case where the prescribed period of time Tb for which the observation is not performed is longer than the prescribed period of time Ta for which the observation is performed, and the observation point is moved between the objects, a period is generated in which both of the objects before and after the movement are displayed as the information of the high content level, and a difficulty in viewing for the user can be further reduced.

Further, as illustrated in FIG. 13, by increasing the prescribed period of time Tb for which the observation is not performed as the number of objects that the user desires to simultaneously observe carefully increases, it is possible to eliminate a problem that when the user desires to observe carefully a plurality of objects, the information content display mode of the object is frequently switched as soon as the visual line is removed, and thus, the user has a difficulty in viewing. FIG. 13 illustrates an example in which the prescribed period of time Tb for which the observation is not performed increases as the number of objects that the user desires to look at increases, and for example, in a case where the number of objects increases to 1, 2, and 3, the prescribed period of time Tb for which the observation is not performed increases to T1, T1+T2, and T1+T2+T3.

As described above, according to this example, by performing control such that when progressing to the information display at the high content level, the progress is performed after the observation point stays for the prescribed period of time Ta or longer, whereas when returning to the information display at the low content level, the return is performed after the observation point has deviated for the prescribed period of time Tb or longer, it is possible to reduce or eliminate a problem that when the user desires to observe carefully the plurality of objects or the vicinity of the plurality of observation points with interest or intention, the information content display mode is changed as soon as the visual line is removed, and the information content display mode is frequently switched, and thus, the user has a difficulty in viewing.

EXAMPLE 3

Figure 14A:
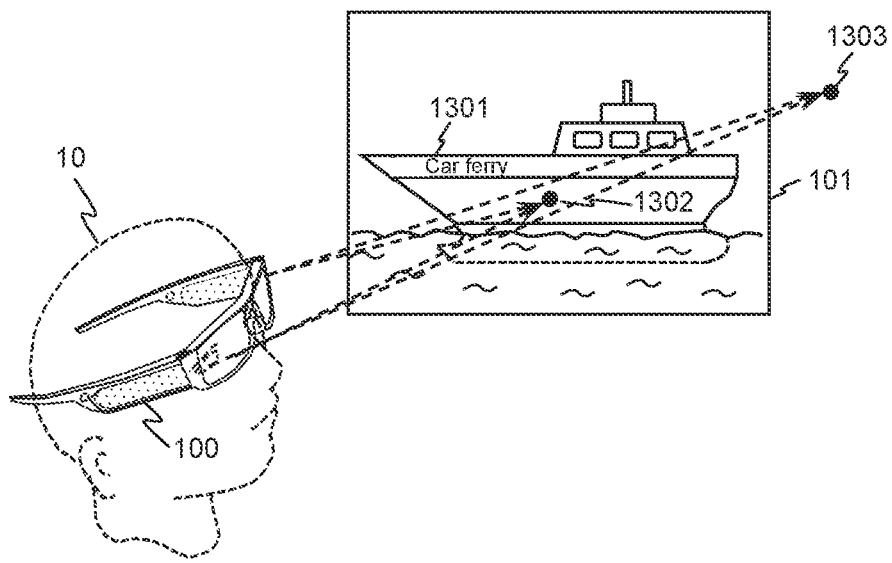
FIG. 14A and FIG. 14B are diagrams illustrating an image display method in the case of displaying additional information in Example 3.
Figure 14B:
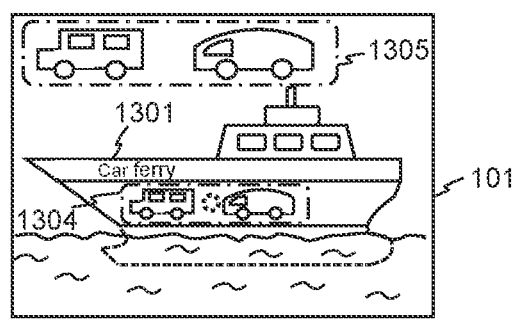

FIG. 14A and FIG. 14B are diagrams appearance-schematically illustrating an image display method in the case of displaying the additional information of the object that the user observes with the HMD in this example. FIG. 14A illustrates that the user 10 observes a car ferry 1301 as the object, and in a state where an observation point 1302 is on the surface of the car ferry 1301, intention for looking at the additional information of the object such as an internal structure of the car ferry 1301 is detected by a movement to an object depth direction of the observation point. An observation point 1303 is at a position extending in the depth direction from the observation point 1302 of the car ferry 1301 that is the object, and the intention for looking at the additional information of the object such as the internal structure of the car ferry 1301 is detected by a movement to the observation point 1303 from the observation point 1302. In a case where the observation point 1302 is moved to the observation point 1303, as illustrated in FIG. 14B, an internal structure 1304 represented as a car that is boarded in the car ferry 1301 is transparently displayed as the additional information, and thus, the user 10 is capable of looking at the additional information such as the internal structure with a simple user interface, and user-friendliness can be improved. In addition, by enlargedly displaying the internal structure that is the additional information within the visual field display range 101, for example, as with an internal structure 1305, it is possible to more articulately visually recognize the additional information such as the internal structure. In addition, in a case where the observation point 1303 is returned to the observation point 1302, the display state is returned to the original display state, and thus, it is possible to restore a state of not displaying the additional information with a simple operation.

Figure 15A:
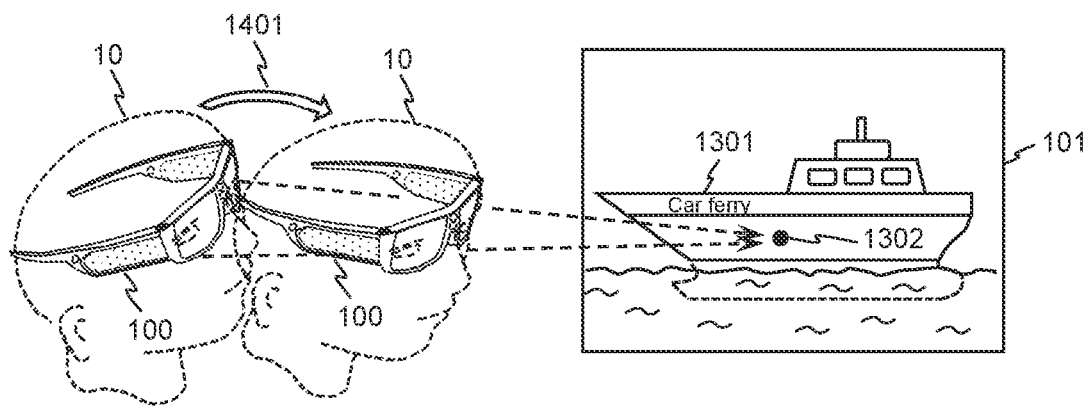
FIG. 15A and FIG. 15B are diagrams illustrating another image display method in the case of displaying the additional information in Example 3.
Figure 15B:
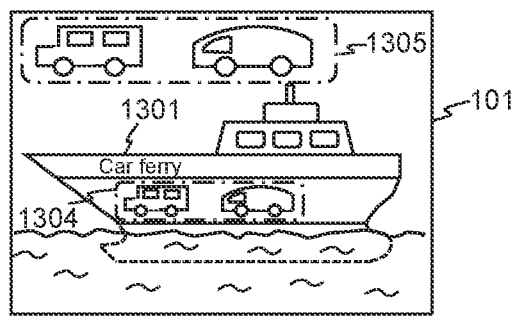

FIG. 15A and FIG. 15B are diagrams appearance-schematically illustrating another image display method in the case of displaying the additional information in this example. FIG. 15A illustrates that the user 10 observes the car ferry 1301 as the object, and in a state where the observation point 1302 is on the surface of the car ferry 1301, the intention for looking at the additional information of the object such as the internal structure of the car ferry 1301 is detected by the user 10 moving the head forward to be tilted forward, as illustrated by an arrow 1401. It is a gesture or an action similar to so-called sticking out the head when the user desires to look at something clearly. The movement of the head of the user 10 wearing the HMD 100 can be detected by using the acceleration sensor 742 and the gyroscope sensor 743 that are mounted on the HMD 100. In addition, the movement of the head of the user 10 can also be detected by using the triaxial type geomagnetic sensor 744. The intention for looking at the additional information of the object such as the internal structure of the car ferry 1301 is detected by moving the head of the user 10 forward to be tilted forward. In a case where the head of the user 10 is tilted forward, as with FIG. 14B, as illustrated in FIG. 15B, the internal structure 1304 represented as the car that is boarded in the car ferry 1301 is transparently displayed as the additional information, and thus, the user 10 is capable of looking at the additional information such as the internal structure with a simple user interface. In addition, the internal structure that is the additional information within the visual field display range 101 may be enlargedly display, for example, to be easily visible as with the internal structure 1305.

Figure 16A:
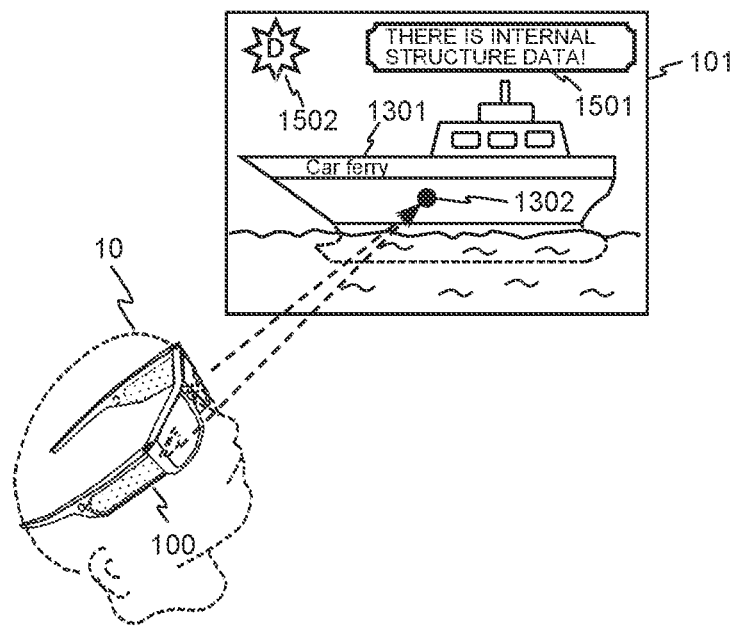
FIG. 16A and FIG. 16B are diagrams illustrating another image display method in the case of displaying the additional information in Example 3.
Figure 16B:
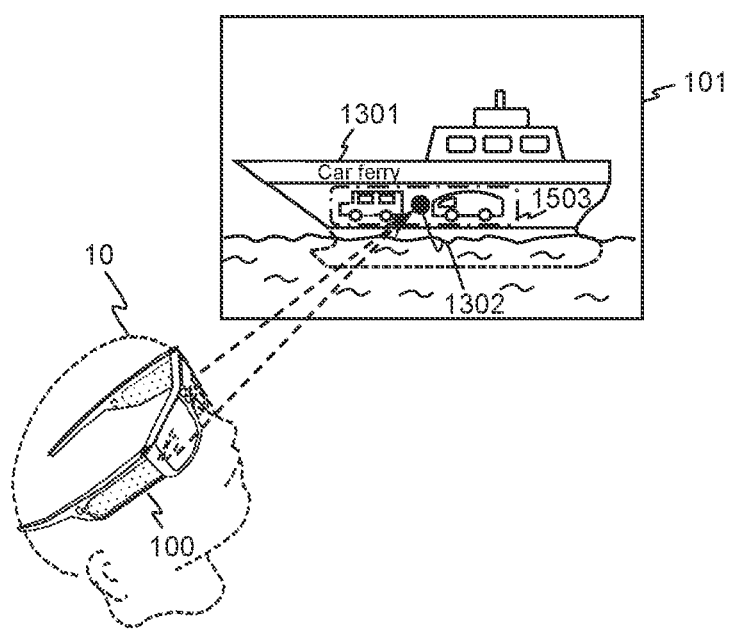

FIG. 16A and FIG. 16B are diagrams appearance-schematically illustrating another image display method in the case of displaying the additional information in this example. FIG. 16A and FIG. 16B illustrate that in a case where the object includes the additional information such as internal structure data, at a time point when the object is the observation target, the existence of the additional information such as the internal structure data is displayed, a mark symbol indicating the existence is displayed, or the internal structure that is the additional information is faintly displayed. In a state where the observation point 1302 is on the surface of the car ferry 1301 that is the object, as illustrated in FIG. 16A, as a display indicating the existence of the internal structure data, for example, a letter 1501 such as "There is internal structure data!" is displayed. In addition, as a mark indicating the existence of the internal structure data, for example, D mark symbol 1502 representing D of existing data (Data) is displayed. In addition, as illustrated in FIG. 16B, the internal structure 1304 represented by the car that is boarded in the car ferry 1301 is faintly displayed as the additional information. Accordingly, at a time point when the user observes the object as the target that the user is interested in, the existence of the additional information of the object can be simply and conveniently known.

Note that, in the above description, the HMD has been described as a specific example of the image display device for addressing the interest of the user, the method of the present invention can be applied even to a device such as a smart phone, a personal computer, and a tablet insofar as the device has the same function as that of the HMD and displays an image. For example, in the smart phone or the like, the eyes are captured with a built-in visible camera to detect the right and left visual lines, and the display target to be displayed as the information of the high content level can be confirmed by the observation time for which the observation point detected from the end of the visual line stays.

EXAMPLE 4

In the above description, the display target to be displayed as the information of the high content level is confirmed by the anchoring observation time of the detected observation point, but in this example, an example using another method will be described.

Figure 17:
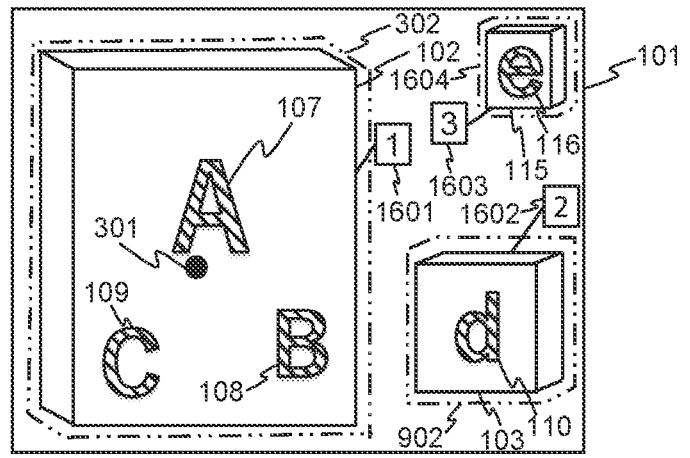
FIG. 17 is a diagram illustrating a display example of a tag for discriminating an object in Example 4.

FIG. 17 is a diagram illustrating a display example of a tag for discriminating the object in this example. As illustrated in FIG. 17, by receiving selective input from the user with respect to a tag (1601, 1602, and 1603) applied to each object, the display target to be displayed as the information of the high content level may be confirmed. The selective input from the user, for example, is performed by sound input, but is not limited thereto. For example, in a state where the objects are closely spaced, in a case where it is difficult to confirm the object to be displayed as the information of the high content level only by the anchoring observation time of the observation point, the accuracy of confirming the object to be displayed as the information of the high content level increases by using the input reception of the tag selection together. The tag may be displayed constantly, may be displayed in the case of determining that it is difficult to confirm the object to be displayed as the information of the high content level only by the anchoring observation time of the observation point, or may be displayed on the basis of a tag display request of the user.

Figure 18:
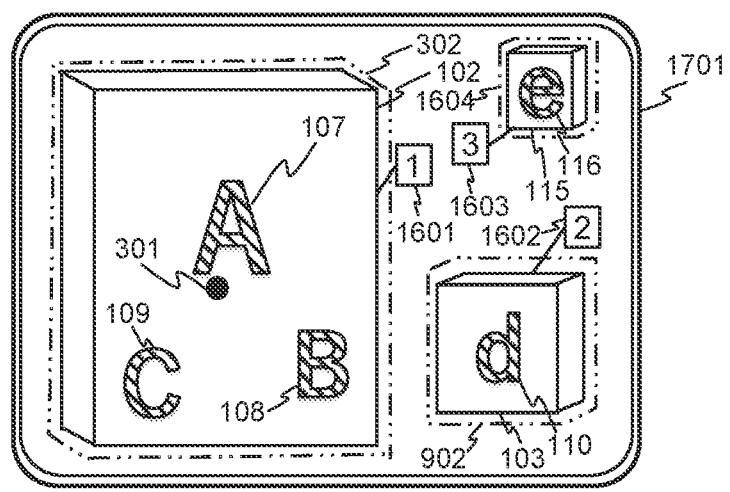
FIG. 18 is a diagram illustrating a display example of a smart phone in Example 4.

In addition, by using a tag selection method, it is possible to apply the method of this example even to a device not having a function of detecting the observation point of the user. For example, as illustrated in FIG. 18, the method of this example can be applied to a certain smart phone 1701. A functional block configuration of the smart phone 1701 is basically the same as that in FIG. 7, except that the detection of the visual line and the detection of the observation point are not performed. In addition, the real object is displayed as a captured image of a camera mounted on the smart phone 1701. In the case of the smart phone 1701, selection using tapping can also be used as a method of receiving the tag selective input, in addition to the sound input.

The examples have been described, but the present invention is not limited to the examples described above, and includes various modification examples. For example, the examples described above have been described in detail in order to explain the present invention in an understandable manner, and are not necessarily limited to having all the configurations described above. In addition, a part of a configuration in a certain example can be replaced with a configuration in another example, and the configuration in another example can also be added to the configuration in the certain example. In addition, the addition, the deletion, and the replacement of another configuration can be performed with respect to a part of a configuration in each example.

In addition, it has been described that each of the configurations, functions, processing units, processing means, and the like processor is attained with a software process by reading and executing a program for attaining each function, but a part or all thereof, for example, may be attained with hardware by being designed with an integrated circuit. In addition, information for attaining each function, such as a program, a table, and a file, may be stored in a recording device such as a memory and a hard disk, or a recording medium such as an IC card and a SD card, or may be stored in a device on a communication network. In addition, the configuration of the HMD 100 may not be housed in one housing, and a part of the configuration may be housed in another housing and the housings may be connected by wired communication or wireless communication to perform a process in cooperation, or a part of the process may be performed by the information server 130.

REFERENCE SIGNS LIST

100 Head mounted display (HMD)
130 Information server
101 Visual field display range
102, 103, 115 Object
106, 113, 201, 204, 301, 303, 402, 404, 502, 505, 901, 1001,
1002, 1302, 1303 Observation point
111, 202 Prescribed range
112, 203 Vicinity of observation point
302, 403, 503, 902, 1604 Display range of object
710 Processor
711 Virtual object generation processing unit
712 Observation point detection processing unit
713 Observation point position determination processing unit
714 Low content level information processing unit
715 High content level information processing unit
716 Object additional information processing unit
731 Camera unit
734 Display processing unit 735 Manipulation input unit
739 Communication unit
740 Sensor unit

The invention claimed is:

1. An image display device displaying an image that a user is interested in, the image display device comprising: a display processing unit displaying an image within a visual field display range of the user; and a processor controlling an entire operation including a display operation on the display processing unit, wherein the image displayed within the visual field display range includes several objects, wherein the processor controls the display processing unit such that, in a state in which information is displayed at a low content level within the visual field display range by control of the display processing unit, when an observation point that the user observes stays in an object for a prescribed period of time Ta or longer, the object is displayed as the information of a high content level, whereas when the observation point has deviated from the object for a prescribed period of time Tb or longer, a vicinity of the observation point is returned to the information display at the low content level, wherein the processor performs control such that the prescribed period of time Tb is longer than the prescribed period of time Ta, and wherein the processor performs control such that the prescribed period of time Tb increases as the number of objects increases.

2. The image display device according to claim 1, wherein the processor performs control such that additional information of the object is displayed when interest or intention of the user for checking the additional information of the object is detected by a forward movement of a head of the user observing the object.

3. The image display device according to claim 2, wherein the processor performs control such that the additional information of the object is enlargedly displayed.

4. The image display device according to claim 2, wherein the processor performs control such that when there is the additional information of the object, existence of the additional information or a mark indicating the existence of the additional information is displayed or the additional information is faintly displayed, at a time point when the object is an observation target.

5. An image display device displaying an image that a user is interested in, the image display device comprising: a display processing unit displaying an image within a visual field display range of the user; and a processor controlling an entire operation including a display operation on the display processing unit, wherein the image displayed within the visual field display range includes several objects, wherein the processor controls the display processing unit such that, in a state in which information is displayed at a low content level within the visual field display range by control of the display processing unit, when an observation point that the user observes stays in an object for a prescribed period of time, the object is displayed as the information of a high content level, whereas when the observation point has deviated from the object, a vicinity of the observation point is returned to the information display at the low content level, and wherein the processor performs control such that additional information of the object is displayed when interest or intention of the user for checking the additional information of the object is detected by a movement of the observation point in a depth direction of the object.

6. The image display device according to claim 5, wherein the processor performs control such that when progressing to the information display at the high content level, the progress is performed after the observation point stays in the object for a prescribed period of time Ta or longer, whereas when returning to the information display at the low content level, the return is performed after the observation point has deviated from the object for a prescribed period of time Tb or longer.

7. The image display device according to claim 6, wherein the processor performs control such that the prescribed period of time Tb is longer than the prescribed period of time Ta.

8. The image display device according to claim 7, wherein the processor performs control such that the prescribed period of time Tb increases as the number of objects increases.

9. The image display device according to claim 5, wherein the processor performs control such that the additional information of the object is enlargedly displayed.

10. The image display device according to claim 5, wherein the processor performs control such that when there is the additional information of the object, existence of the additional information or a mark indicating the existence of the additional information is displayed or the additional information is faintly displayed, at a time point when the object is an observation target.

* * * * *